United States Patent
Agnew

[11] Patent Number: 6,056,004
[45] Date of Patent: May 2, 2000

[54] PORTABLE COMPRESSION SYSTEM FOR PIPELINE PURGING

[76] Inventor: A. Patrick Agnew, #300, 6025-11 Street S.E., Calgary, Alberta, Canada, T2H 2Z2

[21] Appl. No.: 09/347,806
[22] Filed: Jul. 2, 1999
[51] Int. Cl.⁷ .................................................. B67A 5/51
[52] U.S. Cl. .................. 137/240; 137/899.4; 137/208; 60/39.07
[58] Field of Search ................................ 137/206, 208, 137/899.4, 240; 60/39.07

[56] References Cited

U.S. PATENT DOCUMENTS

| | | | |
|---|---|---|---|
| 2,421,765 | 6/1947 | Taylor | 137/208 |
| 4,375,225 | 3/1983 | Andersson | 137/625.17 |
| 4,383,547 | 5/1983 | Lorenz et al. | 137/240 |
| 4,827,967 | 5/1989 | Junier . | |
| 5,174,323 | 12/1992 | Haselden . | |
| 5,386,686 | 2/1995 | Chretien et al. | 60/39.07 |
| 5,433,236 | 7/1995 | Zollinger et al. . | |
| 5,444,886 | 8/1995 | Takashina et al. . | |
| 5,462,078 | 10/1995 | Andenmatten et al. | 137/209 |
| 5,501,200 | 3/1996 | Bogartz | 123/527 |
| 5,531,240 | 7/1996 | Kelada . | |
| 5,577,528 | 11/1996 | Saha . | |

*Primary Examiner*—A. Michael Chambers
*Assistant Examiner*—Thomas L. McShane

[57] ABSTRACT

A portable compression system for pipeline purging having a first stage comprising a power turbine which drives an air intake compressor. An air cooler is connected to a recovery plenum line from the power turbine. A drive shaft extending from the power turbine operates a compressor that is connected to the air cooler. An exhaust line is connected to the compressor, so that exhaust gas produced by the power turbine is utilized as a compressed gas. Second and third stages are provided having a plurality of air coolers between compressors that are connected to the first stage, so that the final compressed gas can be utilized for purging pipelines.

5 Claims, 2 Drawing Sheets

PORTABLE COMPRESSION SYSTEM FOR PIPELINE PURGING

BACKGROUND OF THE INVENTION

1. Field of the Invention

The present invention relates generally to fluid transport piping systems. More particularly, the invention comprises a portable compression system for pipeline purging that provides recovery of combustion gases for the purpose of creating a high pressure non-combustible gas for use in purging of gas pipelines, oil pipelines and pipelines of hydrocarbon producing factories. The current invention is innovative and will find application in various pipeline construction industries.

In general, the disclosed invention is described as it relates to the field of gas pipeline, oil pipeline and hydrocarbon producing factories pipeline purging. However, the invention is applicable to any task in which it is desired to clear pipelines, so that the pipelines can be repaired or replaced when needed.

Thus, it can be seen that the potential fields of use for this invention are myriad and the particular preferred embodiments described herein is in no way meant to limit the use of the invention to the particular field chosen for exposition of the details of the invention.

A comprehensive listing of all the possible fields to which this invention may be applied is limited only by the imagination and is therefore, not provided herein. Some of the more obvious applications are mentioned in the interest of providing a full and complete disclosure of the unique properties of this previously unknown general purpose article of manufacture. It is to be understood from the outset that the scope of this invention is not limited to these fields or to the specific examples of potential uses presented herein.

2. Description of the Prior Art

Within the natural gas transmission industries it is often required that sections of pipelines be removed from service and repaired before they are returned to service. These events are most commonly pre-planned and part of an elaborate long term maintenance program. Historically, this has meant that a pipe section consisting of many miles (twenty miles or greater) of large diameter pipe (twenty four inches to forty eight inches) at high pressure (one thousand pounds per square inch and greater) is isolated and simply blown down creating a large release of natural gas to the atmosphere. The issue is the substantial loss of natural gas and the related value, the significant release of a potent green house gas and duration of the loss of use of the pipeline during this down time.

The industry has largely recognized the impact of green house gases and has adapted several practices to reduce this impact. One practice is to burn the natural gas thus converting the gas to the less damaging carbon dioxide. The other method is to utilize pull down compression to draw gas out of the isolated section and deliver it to an adjacent pipeline section. Both of these methods to mitigate the problem are time consuming and require specialized expensive equipment. Because of downtime constraints of modern facilities, utilizing these methods have only been partially successful and large volumes of gas inventory are wasted and gas emissions directed into the atmosphere.

It would be conceivable to displace the natural gas in a section with another substance, however, there exist obstacles. Purging the gas from the system with compressed air is technically feasible, but the introduction of oxygen into a hydrocarbon vessel would create the very undersible potential for an explosion. This is unacceptable. An inert substance such as nitrogen to displace the gas would again be feasible, but the cost and extended time to achieve a major purge would be unacceptable.

With oil transmission systems there exists a somewhat similar situation in that pipelines require a periodic repair program to facilities which are large diameter, high pressure and sections are long, requiring the vacating of large volumes of oil. Unlike gas pipelines, the vacating of the pipeline cannot include the release of product to the environment. Like gas pipelines, duration of a shut down is critical to the pipeline owner. The most common methods of displacing oil from the pipeline is to drain down the pipeline or purge the pipeline with an inert medium such as nitrogen. Again, air is an unacceptable purge medium. The cost of nitrogen being excessive and not available in large quantities, the owner is forced to balance cost and down time in developing the overall repair program.

Elsewhere within the oil and gas industry as well as refining and petrochemicals, there exist many applications which would benefit from a large supply of high pressure inert medium. The primary use would be to purge hydrocarbon containing facilities including pipelines, gas plants, oil, batteries, tanks, refineries and petrochemical facilities.

U.S. Pat. No. 4,827,967 to Junier discloses a plug valve. A sealing assembly is for sealing off a space between a stem tube and guide tube of the plug valve in which the sealing assembly contains compressible packing. The present invention is completely different than this patent, since it is a system used for purging pipelines.

U.S. Pat. No. 5,174,323 to Haselden discloses a liquid material reservoir. A liquid material is transported from a holding or storage tank to the reservoir, so that the reservoir will distribute the liquid material, such as by gravity, to a distribution point within a system. The present invention is completely different than this patent, since it is a system used for purging pipelines.

U.S. Pat. No. 5,433,236 to Zollinger et al. Discloses an apparatus for moving a pipe inspection probe through piping. The apparatus uses a precise application of a pressure differential to maneuver an inspection device through piping, rather than using cables to pull or push the inspection device through the piping. The present invention utilizes an exhaust gas from a power turbine for pipeline purging which is different than this patent.

U.S. Pat. No. 5,444,886 to Takashina et al. discloses an apparatus for cleaning a piping. A pig is reciprocated within a pipe conduit, so that the interior of the pipe conduit can be efficiently cleaned. This patent uses compressed gas to move the pig through the pipe conduit. The present invention uses the exhaust gas from the power turbine for this purpose.

U.S. Pat. No. 5,531,240 to Kelada discloses a method and apparatus for spill free liquid transfer. A portable or a fixed system safely transfers regulated and environmentally hazardous liquids from top or bottom connections of a source container, pipe or equipment to a receiving vessel without retaining liquid in connecting pipes that may spill and contaminate the environment when the pipes are disconnected. This patent utilizes a pressurized inert gas to transfer the liquids, while the present invention uses exhaust gas to purge pipelines.

U.S. Pat. No. 5,577,528 to Saha et al. Discloses an apparatus for upgrade or repair of in-service pipelines. The apparatus has a built-in repairing mechanism for repairing a pipeline section and does not require taking such pipeline section out of service and does not require construction of a separate bypass around pipe sections upgraded or repaired. The present invention is different than this patent since it uses an exhaust gas from a power turbine to purge pipelines, so that the pipelines can be repaired.

None of the above inventions and patents, taken either singly or in combination, is seen to describe the instant invention as claimed.

SUMMARY OF THE INVENTION

The present invention is a portable compression system for pipeline purging that consists of conventional lightweight gas turbine/compressor units and air coolers. In general the invention includes three or more medium power gas turbine/compressor facilities with sufficient intermediate cooling to ensure that lower temperatures are maintained, so that damage to equipment or pipeline coating are eliminated and allows repair and replacement of the pipeline when needed. The compressor packages are configured in series, each stage designed to provide successively low discharge pressures.

What is needed for gas pipelines is a system with a suitable feature to affect a fast, cost effective, safe purge. This purge will result in conservation of a large component of gas, to dramatically reduce the gas emission associated with repair work and will allow work to proceed at the fastest schedule possible.

What is highly desirable for oil pipelines is a cost effective supply of an inert gas in large quantities and at high pressure. This will greatly improve oil pipeline companies ability to conduct the repair work safely. An added feature required with all applications discussed is portability.

Accordingly, it is a principal object of the invention to provide a portable compression system for pipeline purging that will overcome the shortcomings of the prior art devices.

Another object of the invention is to provide a portable compression system for pipeline purging that uses a first gas turbine exhaust as compressed gas in a succeeding stage, which can be coupled to a gas pipeline with a series of valves for a gas pipeline purging or can be coupled to an oil pipeline with pigs therein for an oil pipeline purging.

An additional object of the invention is to provide a portable compression system for pipeline purging in which a first stage of compression is mounted on a trailer, while a second and third stage of compression are mounted on another trailer and are constructed out of lightweight equipment to maximize portability.

A further object of the invention is to provide a portable compression system for pipeline purging that is simple and easy to use.

A still further object of the invention is to provide a portable compression system for pipeline purging that is economical to manufacture.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
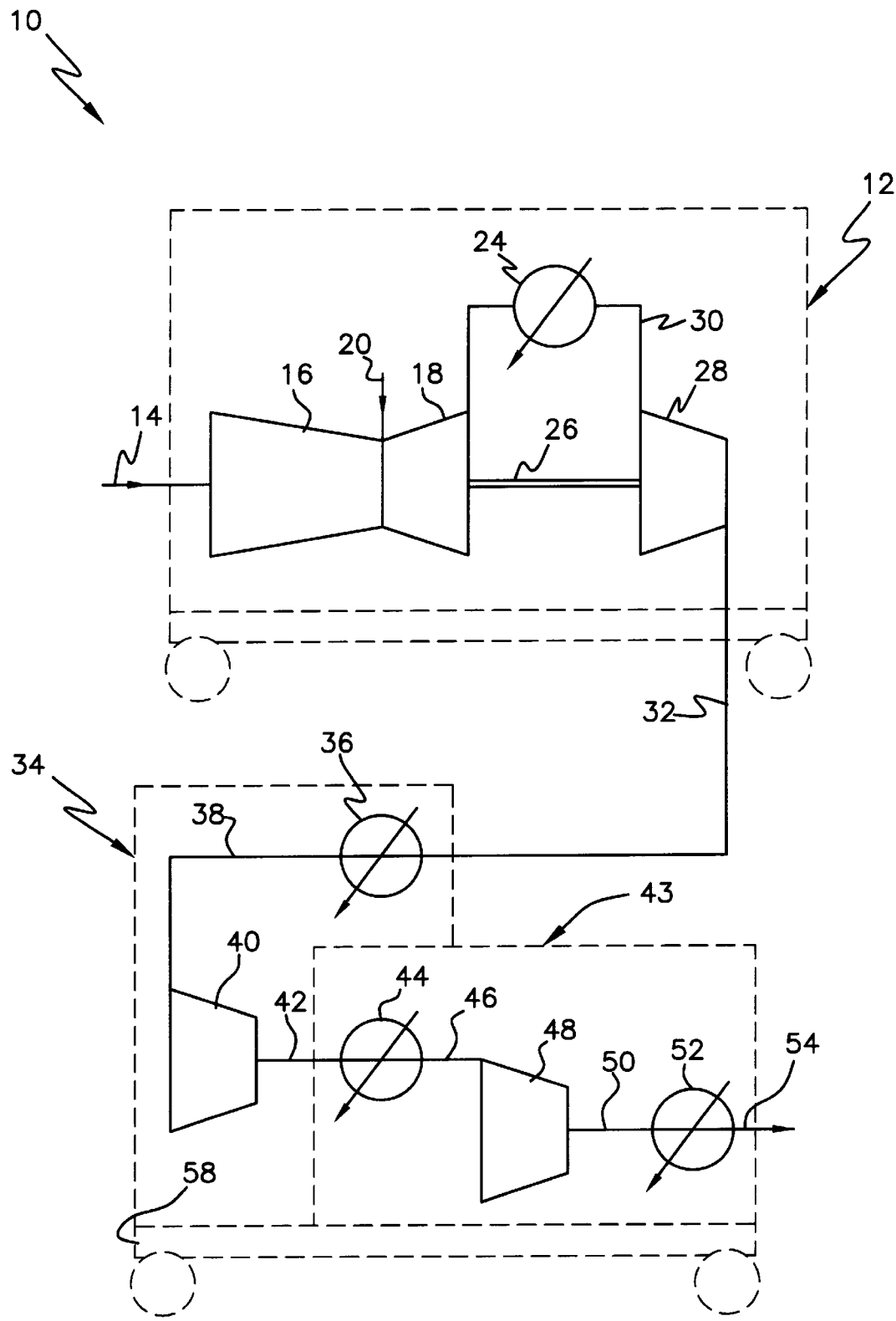
FIG. 1 is a schematic diagram of the present invention.

In the drawings similar reference characters denote similar elements throughout the several views. FIG. 1 illustrates a portable compression system 10 for pipeline purging having a first stage 12 comprising an air intake line 14. Intake compressor 16 is connected to air intake line 14. Power turbine 18 drives air intake compressor 16. Fuel line 20 is connected to power turbine 18. Recovery plenum line 22 is connected to power turbine 18 while air cooler 24 is connected to recovery plenum line 22. A drive shaft 26 extends from power turbine 18. Compressor 28 is operable by drive shaft 26 from power turbine 18. Feed line 30 is connected between air cooler 24 and compressor 28. Exhaust line 32 is connected to compressor 28, so that exhaust gas produced by power turbine 18 is utilized as a compressed gas.

A second stage 34 consists of an air cooler 36 connected to exhaust line 32 from first stage 12. Feed line 38 is connected to air cooler 36. A compressor 40 is connected to feed line 38. Discharge line 42 is connected to compressor 40. A third stage 43 consists of air cooler 44 connected to discharge line 42 from second stage 34. Feed line 46 is connected to air cooler 44. Compressor 48 is connected to feed line 46. Discharge line 50 is connected to compressor 48. Another air cooler 52 is connected to discharge line 50. An exhaust line 54 is connected to the other air cooler 52, so that the final compressed gas can be utilized for purging pipelines. First stage 12 is mounted upon a trailer 56 for portability, while second stage 34 and third stage 43 are both mounted upon a trailer 58 for portability.

It can be seen from the preceding description that in use, air consisting primarily of seventy seven percent of nitrogen and seventeen percent of oxygen enters intake compressor 16 at air intake line 14 of the first stage 12. Fuel being natural gas or other hydrocarbon enters the system 10 through fuel line 20, is ignited and expands through power turbine 18 exhausting into recovery plenum line 22, where it may be combined with exhaust gas from other power turbines. The exhaust gas being approximately seventy seven percent nitrogen and twenty two percent carbon dioxide is cooled in air cooler 24 and fed via feed line 30 into compressor 28 powered by power turbine 18 through drive shaft 26.

The discharged gas at twenty five to forty pounds per square inch in exhaust line 32 is cooled in air cooler 36 in second stage 34 and delivered to compressor 40 via feed line 38. Compressor 40 compresses the gas to an intermediate pressure of three hundred to four hundred pounds per square inch. The gas is sent to air cooler 44 in third stage 43 through discharge line 42 and then sent to compressor 48 via feed line 46. The gas now at delivery pressure of between seven hundred to one thousand pounds per square inch is cooled in air cooler 52 and delivered out through exhaust line 54.

Additional stages of compression may be added if necessary to produce different volume and pressure requirements for various applications. Stage 12 is mounted on a trailer 56. Second and third stages 34, 43 are mounted on trailer 58. All stages 12, 34 and 43 are constructed of lightweight equipment to maximize portability.

Figure 2:
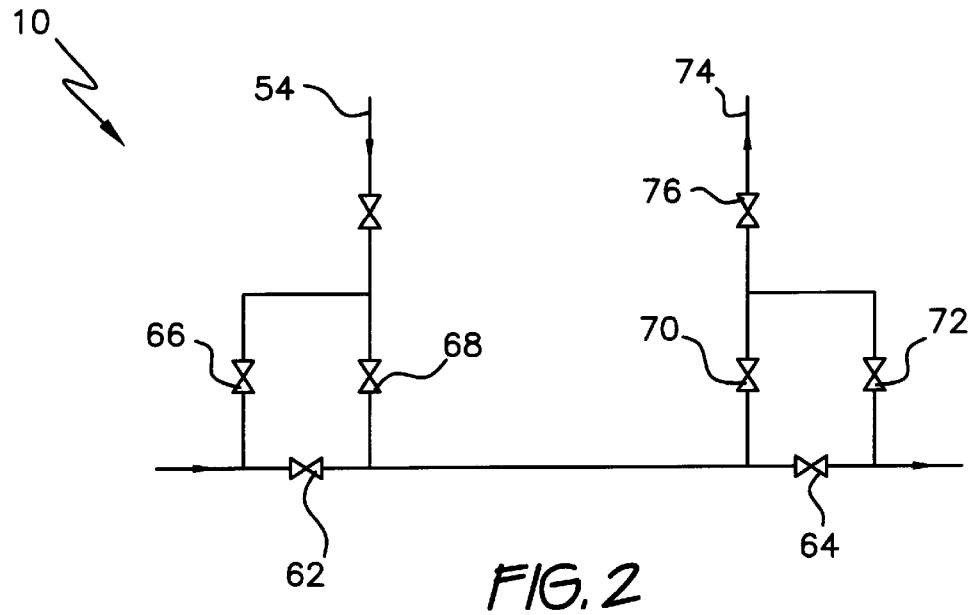
FIG. 2 is a schematic diagram of a typical gas pipeline segment and purge configuration.

FIG. 2 shows a typical gas pipeline 60. The segment to be purged is contained between upstream block valve 62 and downstream block valve 64. To set up for purging, valves 62, 64 and 66 are closed, while valves 68, 70 and 72 are opened. The purge gas enters the system from exhaust line 54 of the third stage 43 through valve 68 and discharges the system around valve 64 through valves 70 and 72. The high speed of purge maintains turbulence and allows for a very small mixing zone. Gas is sampled at line 74 by bleeding the fluid through valve 76. When the nitrogen/carbon dioxide gas is detected, the purge is complete. The purge gas may now be blown down through valves 68 and 70 after valve 72 is closed. After completion of repair activities, the system is filled with gas by opening valve 66, discharging the purge gas through valve 76. Once the purge gas is removed from the system the pipeline segment 60 is repressurized with natural gas an returned to service.

Figure 4:
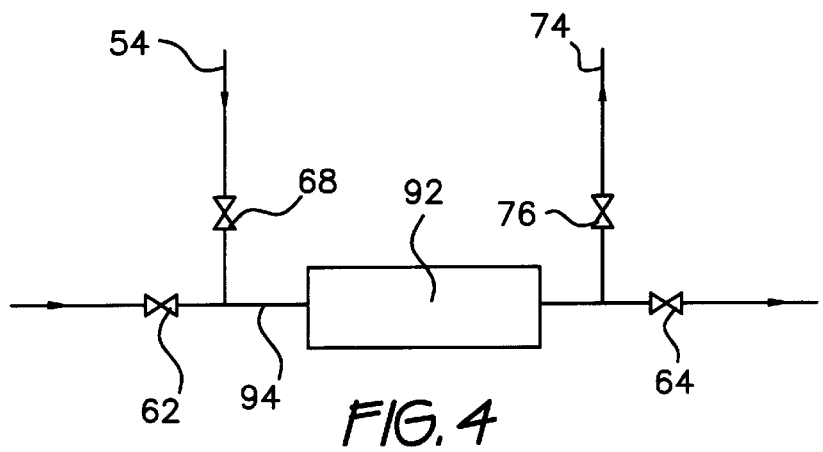
FIG. 4 is a schematic diagram of a typical pipeline segment and purge configuration for a hydrocarbon producing factory.
Figure 3:
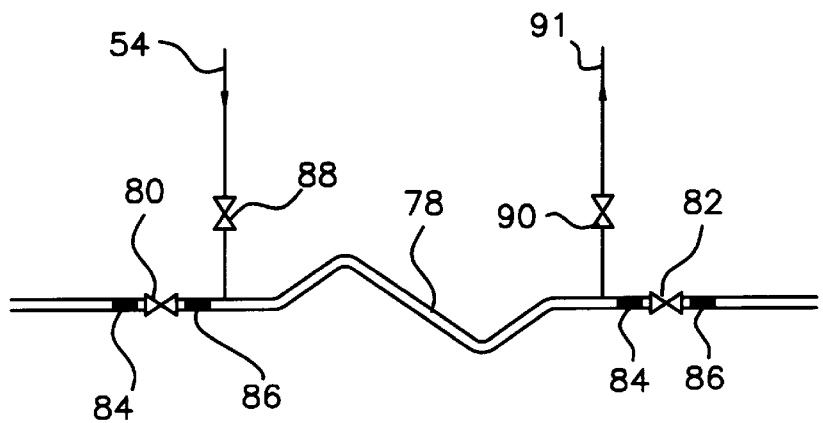
FIG. 3 is a schematic diagram of a typical oil pipeline segment and purge configuration.

FIG. 3 shows an oil pipeline segment 78 contained between mainline block valves 80 and 82. To initiate purge activities two pipeline pigs 84 and 86 are positioned straddling block valve 80. The purge commences by injecting purge gas from exhaust line 54 of the third stage 43 into riser valve 88 pushing downstream pig 86 into position at valve 82. The purge is now complete and purge gas is discharged through valves 88 or 90. After completion of repair work, valve 80 is opened and the upstream pig 84 is advanced to a position at valve 82, while purge gas is expelled out through valve 90 and line 91. Block valve 82 is opened and pipeline 78 may commence normal operations. FIG. 4 shows a gas or oil hydrocarbon producing factory 92. The pipeline 94 for the gas or oil hydrocarbon producing factory 92 may be purged as the gas pipeline 60 in FIG. 2, the oil pipeline 78 in FIG. 3 or any combination thereof.

It is to be understood that the present invention is not limited to the embodiments described above, but encompasses any and all embodiments within the scope of the following claims.

I claim:

1. A portable compression system for pipeline purging having a first stage comprising:
    an air intake line;
    an intake compressor connected to said air intake line;
    a power turbine drives said air intake compressor;
    a fuel line connected to said power turbine;
    a recovery plenum line connected to said power turbine;
    an air cooler connected to said recovery plenum line;
    a drive shaft extending from said power turbine;
    a compressor operable by said drive shaft from said power turbine;
    a feed line connected between said air cooler and said compressor; and
    an exhaust line connected to said compressor, so that exhaust gas produced by said power turbine is utilized as a compressed gas.

2. The portable compression system for pipeline purging as recited in claim 1, having a second stage comprising:
    an air cooler connected to said exhaust line from said first stage;
    a feed line connected to said air cooler;
    a compressor connected to said feed line; and
    a discharge line connected to said compressor.

3. The portable compression system for pipeline purging as recited in claim 2, having a third stage comprising:
    an air cooler connected to said discharge line from said second stage;
    a feed line connected to said air cooler;
    a compressor connected to said feed line;
    a discharge line connected to said compressor;
    another air cooler connected to said discharge line; and
    an exhaust line connected to said other air cooler, so that the final compressed gas can be utilized for purging pipelines.

4. The portable compression system for pipeline purging as recited in claim 1, wherein said first stage is mounted upon a trailer for portability.

5. The portable compression system for pipeline purging as recited in claim 3, wherein said second and said third stages are both mounted upon a trailer for portability.

* * * * *